(12) United States Patent
Deroulers et al.

(10) Patent No.: US 9,155,314 B2
(45) Date of Patent: Oct. 13, 2015

(54) FLEXIBLE, SELF-SUPPORTING, ANTI-ADHESIVE, AND CELLULAR MEMBRANE DEFINING A MOULD OR CAVITY PLATE FOR PREPARING FOOD PRODUCTS

(75) Inventors: Pascal Deroulers, Le Maisnil (FR); Stephane Claustre, Lille (FR)

(73) Assignee: ETS GUY DEMARLE, Waverin (FR)

( * ) Notice: Subject to any disclaimer, the term of this patent is extended or adjusted under 35 U.S.C. 154(b) by 698 days.

(21) Appl. No.: 12/992,796

(22) PCT Filed: May 12, 2009

(86) PCT No.: PCT/FR2009/050865
§ 371 (c)(1),
(2), (4) Date: Nov. 15, 2010

(87) PCT Pub. No.: WO2009/147344
PCT Pub. Date: Dec. 10, 2009

(65) Prior Publication Data
US 2011/0088567 A1    Apr. 21, 2011

(30) Foreign Application Priority Data
May 14, 2008    (FR) ..................................... 08 53123

(51) Int. Cl.
*A21B 3/13*    (2006.01)
(52) U.S. Cl.
CPC ..................................... *A21B 3/138* (2013.01)
(58) Field of Classification Search
USPC ........... 99/426, 432, 439, 440, 441, 442, 448; 220/573.1, 912, 62.13, 62.19, 62.22; 249/114.1–115, 117, 119, 134; 264/299, 337

See application file for complete search history.

(56) References Cited

U.S. PATENT DOCUMENTS 4,770,927 A * 9/1988 Effenberger et al. .......... 442/126
5,230,937 A * 7/1993 Effenberger et al. .......... 428/113
5,232,609 A * 8/1993 Badinier et al. ............... 249/102

(Continued)

FOREIGN PATENT DOCUMENTS

DE    102004047705 A1    4/2006
EP    0 235 037 A    9/1987

(Continued)

OTHER PUBLICATIONS

French Preliminary Search Reported, dated Jan. 13, 2009, in FR 0853123.

(Continued)

*Primary Examiner* — Dana Ross
*Assistant Examiner* — James Sims, III
(74) *Attorney, Agent, or Firm* — Young & Thompson

(57) ABSTRACT

A flexible, self-supporting, anti-adhesive, and cellular membrane defining a mold or a cavity plate for preparing food products, particularly bakery, viennoiserie, pastry, and biscuit products, and in particular for molding, fermenting, and baking bread dough, and which includes a composite structure including a silicone rubber mold (10) consisting of at least one elastomer or at least one silicon resin, and reinforced by a textile-structure framework (11) made of a mixture of inorganic and organic threads (12, 13) and/or fibers. The membrane is characterized in that the inorganic and organic threads (12, 13) and/or fibers represent more than 50 wt % of the textile structure of the framework (11).

16 Claims, 1 Drawing Sheet

(56) References Cited

U.S. PATENT DOCUMENTS

| | | | |
|---|---|---|---|
| 5,992,411 A * | 11/1999 | Ayot et al. | 126/246 |
| 2003/0047838 A1 | 3/2003 | Beale et al. | |
| 2003/0148010 A1 * | 8/2003 | Keese et al. | 426/505 |
| 2004/0249059 A1 * | 12/2004 | Akbar et al. | 524/588 |
| 2009/0107345 A1 * | 4/2009 | Yeung | 99/413 |

FOREIGN PATENT DOCUMENTS

| | | | | |
|---|---|---|---|---|
| FR | 2658034 | A2 | 8/1991 | |
| FR | 2 754 280 | A | 4/1998 | |
| FR | 2774554 | * | 8/1999 | A21B 3/13 |
| FR | 2774554 | A | 8/1999 | |
| WO | 03066328 | A | 8/2003 | |
| WO | 2004/111128 | A | 12/2004 | |
| WO | 2006071993 | A | 9/2006 | |

OTHER PUBLICATIONS

International Search Report, dated Jan. 20, 2010, in PCT/FR2009/050865.

* cited by examiner

FLEXIBLE, SELF-SUPPORTING, ANTI-ADHESIVE, AND CELLULAR MEMBRANE DEFINING A MOULD OR CAVITY PLATE FOR PREPARING FOOD PRODUCTS

BACKGROUND OF THE INVENTION

1. Field of the Invention

The present invention relates to a flexible, self-supporting, anti-adhesive and cellular membrane, defining a mould or cavity plate for preparing food products, in particular, but not exclusively, bakery, viennoiserie, pastry and biscuit products, and in particular for moulding, fermenting and baking bread dough.

The invention relates more particularly to improvements made to the membranes of the above-mentioned type that are the subject of the Applicant's patents EP 0 235 037 B1 and FR 2 658 034, and as also described in patent applications FR 2 774 554 and WO 03/066328.

2. Description of the Related Art

EP 0 235 037 B1 discloses an anti-adhesive former or membrane, intended to support pieces of bread dough or similar throughout the process of fermenting and baking the dough, this membrane being constituted by at least one silicone elastomer or a silicone resin associated with a reinforcing web, said membrane being self-supporting, having a general configuration and predetermined dimensions such that it can rest detachably and interchangeably on a single supporting tray, and being preformed so as to have at least one hollow cavity independent of the support and having any desirable shape corresponding to the individual shapes for breadmaking or similar to be subjected to the fermenting and baking process.

Such a membrane, which can support dough pieces not only during the stages of fermenting and baking dough, but also throughout the intermediate handling and storing stages, can either be aerated or not aerated, and can include a woven, knitted or non-woven web, constituted by glass yarns and/or carbon fibres and/or ceramic threads impregnated and/or coated with at least one elastomer or a silicone resin, conferring the desired anti-adhesive properties. Preforming of the membrane is obtained by moulding and/or forming then stiffening by vulcanization of the elastomer(s) or by curing the silicone resin(s).

Thus, a moulded membrane can have an undulating profile in the form of quasi semi-cylindrical depressions that are more or less broad with a more or less flattened base, these depressions being optionally separated by gaps embodied by a flat surface situated at the top of the depressions and providing an improved heat circulation, or having a succession of flat-bottomed rectangular or square spans, separated by a fold in the shape of an inverted V, for receiving pieces of bakery or viennoiserie dough.

In the case of a pressed membrane, the membrane can have, longitudinally and transversally, successions of hollow cavities, having a rectangular or square shape with a clearance allowing the baked pieces to be removed, and separated by narrow strips, or the membrane can be pressed so as to create oblong-shaped oval cradles with a clearance for allowing the pieces to be removed, these cradles succeeding each other in an adjacent fashion, in order to receive pieces such as rolls or croissants, or also the membrane can be pressed so as to create successive lines of round, hollow dishes, having flat bottoms and a variable diameter, depth and clearance, according to the nature of the pieces to be baked, such as round rolls, rolls for hamburgers, muffins, currant buns, or also the membrane can be pressed so as to create a succession of hollow semi-cylinders of varying width and length, for receiving pieces such as hot-dog rolls or fancy shaped baguettes.

In order to support the food products to be processed, at least one membrane as presented above can rest, detachably and interchangeably, on a supporting tray, to which the membrane can optionally be detachably connected, the tray having the shape of a rectangular or square container, with a flat bottom, preferably open-worked, also within side walls serving to keep the preformed membrane in place, these side walls allowing the trays to be piled or stacked, preferably made of metal, or also of a non-dielectric material that can be used in a microwave oven, the tray moreover being capable of being adapted to the sliding fittings of an oven or to a trolley on which the tray is mounted or incorporated, and intended to enter successively into proving cabinets then ventilated ovens, optionally rotating, or tunnel ovens, for example.

The multi-purpose equipment comprising several membranes having varying numbers and/or shapes of cavities and at least one, but preferably several, associated support trays, allows, in particular, intermediate handling to be dispensed with in the case of peel ovens or tunnel ovens, can be used for all types of products prepared, in particular by the baker/confectioner, with the minimum of bulk and immobilization, both in the peel oven and in the ventilated oven, or even in the tunnel ovens of industrial bakeries, whilst any damaged membrane can be easily replaced, without the need for intervention on the other components of this multi-purpose equipment or system.

In fact, this multi-purpose system offers the possibility of using a set of new membranes that are flexible, interchangeable owing to their fully detachable character with respect to the support in the shape of a tray with side walls intended to receive them, preformed according to the dimensions and shapes of all the varieties of breadmaking products, and which therefore has a very high degree of flexibility in use for the traditional or industrial baker, (for all breads and all ovens), and is very economical, owing to the reduced costs and storage requirements, the field of use of this multi-purpose system not being limited to baking and/or confectionery, but extending to related fields such as biscuit products and cold meat products, and any kind of food products, such as quiches, tarts, pies etc., capable of being prepared by private individuals, industry professionals, the restaurant trade, in a traditional manner, on a production line or industrially.

Patent FR 2 658 034 relates to improvements made to the multi-purpose equipment according to EP 0 235 037 B1 and as shown above and intended to be used for deep-freezing and/or baking of viennoiserie, pastries, fermented or not, egg-yolk dough, biscuits, creams or baked custards, or even some small breadmaking items. More particularly, FR 2 658 034 relates, on the one hand, to an anti-adhesive and self-supporting membrane having the shape of a mould or a cavity plate, which is continuous, the surface of which in contact with the items of viennoiserie, pastries, biscuit products, is smooth and anti-adhesive, and which is flexible and resilient, i.e. is capable of deformation for the requirements of removing said items from the mould, and, on the other hand, a method for producing such a membrane.

According to the desired shape, this membrane is obtained by pressing and/or moulding a knitted fabric, preferably a double knitted fabric, i.e. a textile formed from two interlaced knitted fabrics, of glass or ceramic threads or similar materials, previously impregnated with an anti-adhesive silicone elastomer hardened by vulcanization. The membrane, which has thus acquired its final shape, is then treated on its inner surface by spraying with a silicone elastomer or dipping into a silicone solution, resulting in a flexible coating, having very strong anti-adhesive properties, and a smooth contact surface.

Preferably, the method for producing such a membrane comprises the following steps:
- thorough impregnation of a knitted fabric of threads as stated above with a silicone suitable for contact with food and ensuring the self-supporting structure of the whole after vulcanization;
- removal of the excess silicone so as to obtain an even, uniform and preferably aerated structure;
- shaping or moulding of the silicone-impregnated knitted fabric by pressing so as to obtain the desired mould or plate with the desired cavities;
- vulcanizing the preformed silicone-impregnated knitted fabric; and
- spraying the face turned towards the desired cavity or cavities of the full membrane thus obtained, with a silicone solution of lesser hardness, having high covering and anti-adhesive properties, or
- dipping the thus-obtained membrane into a bath of silicone in order to obtain a smooth silicone surface on the side of the knitted mesh that is turned towards the cavity or cavities.

Generally, at least two silicone coatings of the knitted web are always carried out, the first coating being carried out with a silicone ensuring the rigidity of the material so that it is self-supporting, the last being carried out with a flexible silicone, having very high anti-adhesive properties and, preferably, with a very high elongation coefficient.

A thus-produced membrane can be formed so as to constitute a single cylindrical mould, having a round, square or rectangular cross section, which can be used domestically or professionally for freezing or baking by heat or microwaves of pastries or culinary preparations, however varied these may be, the membrane also being capable of forming several round, square, rectangular or truncated moulds, with or without channels, and then being called a "cavity plate".

A further subject of FR 2 774 554 is a flexible and self-supporting mould or cavity plate, having an anti-adhesive inner surface suitable for contact with food, for the moulding and baking of bread dough or similar, and comprising a cloth defining a support impregnated with at least one resin of the crosslinked polysiloxane type, said cloth being thermoformed and provided with at least one suitable anti-adhesive coating layer, in particular based on a rubber or silicone elastomer suitable for contact with food, at least on its surface that is intended for contact with food.

As an intermediate product for the production of thermoformed articles, in particular moulds or cavity plates as defined above, a subject of this patent document is also a pre-impregnated cloth, constituted by a cloth impregnated with at least one polysiloxane resin that is potentially hot-polymerizable and thermoformable, the term "cloth" being used as a generic term encompassing all textile surfaces or textile constructions and felts, the cloths being capable of being constituted by any textile fibre or textile thread, and comprising flexible woven fabrics, whether woven, knitted, felted (or cloths produced of non-woven fabrics), needle-punched, stitched or produced by another production method. With respect to the fibres, these can be glass fibres, carbon fibres, aromatic polyamide fibres, ceramic fibres, or also a mixture thereof; other fibres can be envisaged insofar as they can withstand a temperature of the order of 300° C. WO 03/066328 relates to composite articles for cooking, comprising a thermoplastic organic polymer cloth impregnated or coated with a heat-resistant polymer and polymerized or crosslinked, and more particularly dough moulds that can be used for containing dough pieces during both the fermenting and the baking phases, the composite structure of the articles having sufficient rigidity for it to be self-supporting and being dimensionally stable up to a temperature of at least approximately 195° C. Preferably, the thermoplastic organic polymer is polyester and the heat-resistant crosslinked polymer is a silicone rubber. Generally, in addition to polyesters, suitable thermoplastic polymers comprise polyamides and polyimides, in particular in the form of fibres, and the textile cloth or structure constituting the supporting framework of the composite article can be a woven fabric, a non-woven or a knitted fabric, a knitted structure of polyester fibres or textured filaments or threads being preferred.

Such a composite structure has sufficient rigidity to be self-supporting and is dimensionally stable up to temperatures of the order of 175 to 195° C.

Composite articles according to the preferred form described in WO 03/066328 have been produced and marketed.

As mentioned in WO 03/066328, these composite articles have the main drawback of not withstanding baking temperatures higher than approximately 175° C. or 195° C., which severely limits their field of use, and therefore their benefit for industrial, semi-industrial and traditional use and even use by the general public.

By contrast, the composite membranes defining cavity moulds produced according to EP 0 235 037 and FR 2 658 034, with mainly glass fibre frameworks, allow baking up to temperatures of the order of 300° C., while providing users with the expected services in terms of anti-adhesivity, easy removal from the mould, flexibility and ease of use, with no return of the mould to the manufacturer due to destruction of the bond between the silicone of the matrix and the glass fibres of the reinforcing framework of the composite membrane.

However, the glass fibre framework of these membranes can exhibit, under intensive use, phenomena of fibres breaking at the locations where the mechanical stresses are greatest, as a result of shearing of the glass fibre threads or filaments, constituting, for example, the mesh of a reinforcing knitted fabric, especially if these moulds are also used in phases of freezing or deep-freezing of the food products contained in the moulds, as the glass fibres become brittle at temperatures of −30° C. to −40° C. As a result, tearing of the membrane can occur, making the mould unusable. Moreover, the more complex the shape of the cellular membrane, the greater the stress undergone by the glass fibre framework on shaping this membrane, owing to the number and/or the shapes of the cells that are themselves complex. Finally, the variation in the quality and/or the sizing characteristics of the glass fibres provided for the production of the cavity moulds can result in limitations in the performance of such moulds.

As far as the Applicant is aware, no flexible mould according to the specific teaching of FR 2 774 554 has been produced and marketed, in particular with a framework constituted by a mixture of glass, carbon, aromatic polyamide and ceramic fibres.

BRIEF SUMMARY OF THE INVENTION

The problem addressed by the present invention is to propose a flexible, self-supporting, anti-adhesive and cellular membrane, defining a mould or plate having cavities for preparing food products, in particular bakery, viennoiserie, pastry and biscuit products, in particular for moulding, fermenting and baking bread doughs, comprising a composite structure including a silicone rubber matrix, constituted by at least one elastomer or at least one silicone resin, and reinforced by a textile-structure framework, constituted by a mixture of inorganic and organic threads and/or fibres, as known from FR 2 774 554, and having a greater wear resistance than the membranes produced according to EP 0 235 037, even in the event of use for deep-freezing or freezing, which have a temperature resistance markedly better than that of the composite articles according to WO 03/066328, and substantially equal to that of the membranes according to EP 0 235 037, while remaining compatible, for its production, with the manufacturing methods according to FR 2 658 034, and with the most varied and the most complex shapes of the cells of the membranes of this type of the state of the art.

More generally, the invention aims to propose a flexible membrane defining a mould or cavity plate that is more suited to practical requirements than the flexible membranes of the state of the art, due to a selection of mixed inorganic and organic fibres for constituting the textile-structure framework.

To this end, the invention proposes a flexible membrane, of the type presented above and known from FR 2 774 554, and characterized in that the inorganic threads and/or fibres represent more than 50 wt % of the textile-structure framework.

Advantageously, the inorganic threads and/or fibres represent a proportion comprised within a range of approximately 60% to approximately 95%, preferably from approximately 70% to approximately 93%, and even more preferentially from approximately 80% to approximately 90% by weight of the framework.

Also advantageously, the inorganic threads and/or fibres comprise ceramic and/or mineral fibres, such as carbon fibres or, preferably, glass fibres, while the organic threads and/or fibres comprise aramid fibres, preferably of Kevlar® (registered trade mark) and/or fibres of thermoplastic polymers, preferably polyester.

Thus flexible membranes are obtained defining a mould or cavity plate of which the life time is very substantially increased, without the need to increase their wall thickness, and without reducing their baking temperature resistance or their ability to withstand negative temperatures, for storing frozen or deep-frozen food products, in comparison with the membranes of the state of the art that perform best in these respects.

In a first advantageous embodiment, the framework is constituted by glass fibres combined with polyester fibres, for constituting moulds or plates having cavities that can be used within a temperature range of approximately −60° C. to approximately +220° C.

In another advantageous embodiment, for baking at high temperatures, the framework is constituted by glass and/or carbon fibres combined with aramid and/or high-performance thermoplastic fibres, such as phenylene polysulfide (PPS) fibres, for constituting moulds or plates having cavities that can be used up to a baking temperature of approximately +300° C.

In the membranes according to the invention, the framework textilestructure can comprise continuous threads, discontinuous threads, mono-filaments and/or multi-filaments produced from said organic and inorganic fibres.

With respect to the textile-structure framework, in a membrane according to the invention, the combination of organic and inorganic fibres for producing this structure is constituted by parallel threads, plated threads, textured threads, mouliné threads, threads combined by twisting, or also by mixing inorganic and organic fibrils.

In a manner known per se, the inorganic and organic fibres constituting the textile-structure framework are fibres that are sized by the deposition of a bonding agent representing an average proportion by weight of the fibres which varies from approximately 0.05% to approximately 10% by weight, the sizing of the fibres being carried out at the level of filaments or at the level of complete threads produced from said fibres.

In a manner also known per se, the textile-structure framework can be a non-woven, multilayer, three-dimensional structure or, preferably, woven with a void fraction comprised between approximately 5% and approximately 60%, or, even more preferentially, knitted, with a void fraction comprised between approximately 5% and approximately 30%.

With respect to the matrix, the silicone rubber of which it is constituted is at least one silicone elastomer chosen from the families of silicone elastomers that are polymerizable at a high temperature, at ambient temperature, or bi-component, one component being polymerizable at a high temperature and the other at ambient temperature.

Finally, in order to homogenize the temperature in the membrane, it is advantageous for supplementary fillers, preferably of the aluminium oxide or iron oxide type, to be added to the membrane matrix.

BRIEF DESCRIPTION OF THE DRAWINGS

Other characteristics and advantages of the invention will become apparent from the description given below, non-limitatively, of embodiment examples described with reference to the attached drawings in which.

DETAILED DESCRIPTION OF THE PREFERRED EMBODIMENTS

Figure 1:
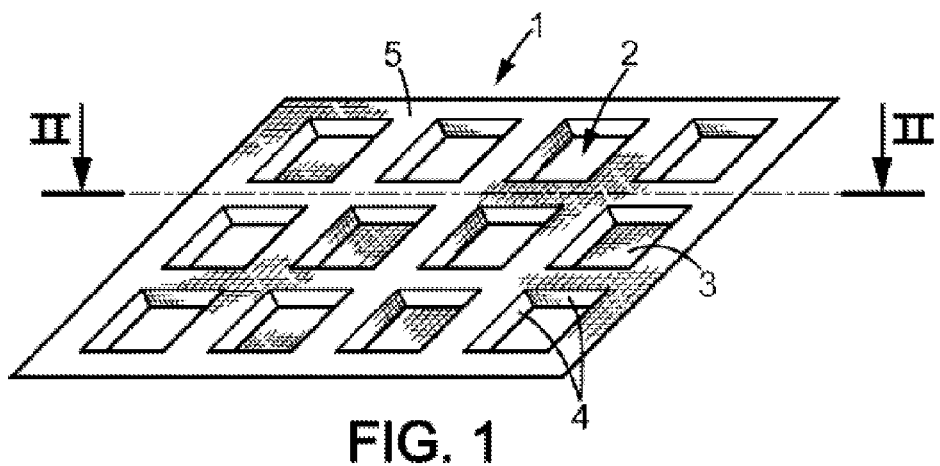
FIG. 1 shows a diagrammatic perspective view of a mould having twelve cavities according to a preferred embodiment example of a composite membrane according to the invention.

FIG. 1 is a general perspective view of a composite membrane according to the invention, having a generally rectangular shape in plan view, defining a mould or plate 1 with twelve substantially identical cavities 2, arranged in three parallel rows, each having four cavities side by side along the length of the membrane, each cavity 2 having the same shape in plan view, also rectangular.

Each cavity 2 more precisely has the form of a truncated-pyramid cavity or hollow with a rectangular base and a low height, the small base of which forms the flat bottom 3 of the cavity 2, the sides 4 of which are flared upwardly and outwardly, thus forming a clearance angle facilitating the removal of any bread dough product, arranged in dough pieces in the cavities 2 for different stages of production such as phases of fermenting, rising of the dough, transport, freezing or deep-freezing, and baking in particular.

Between the cavities 2, the membrane has, at rest, a substantially flat upper face 5, and this thus-preformed membrane is self-supporting, flexible, anti-adhesive and cellular.

Figure 2:
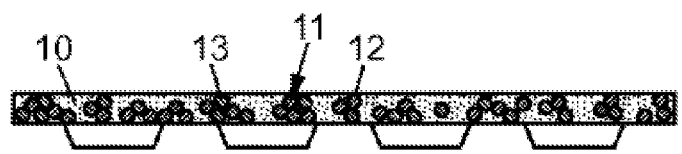
FIG. 2 is a partial view in cross section along II-II of FIG. 1 of the composite membrane and representing the textile-structure framework and the silicone matrix in which the textile framework is embedded.

As shown diagrammatically in FIG. 2, this composite membrane is constituted by a silicone matrix 10 reinforced by a framework constituted by a textile structure 11 based on inorganic fibres, essentially of glass and/or carbon and/or ceramics, which are always the major part by weight, and organic fibres, essentially polyester or aramid fibres such as KEVLAR®, or also thermoplastic fibres called "high-performance" thermoplastic fibres.

For uses of the membrane at low temperatures, down to approximately −60° C. (for deep-freezing or freezing phases) and/or baking at temperatures up to approximately +240° C., the inorganic fibres are preferably solely or predominantly of glass, while the combined organic fibres are preferably solely or predominantly of polyester.

On the other hand, in order to carry out baking up to temperatures reaching approximately +300° C., the inorganic fibres are preferably solely or mostly made of carbon, glass, or a mixture thereof, while the combined organic fibres are solely or predominantly of aramid or high-performance thermoplastic fibres, or a mixture thereof. Among the high-performance thermoplastic fibres, phenylene polysulphide (PPS) fibres can advantageously be used, although their limit temperature is of the order of +230° C., when these fibres are "naked".

But during the development of the present invention it was surprisingly found that PPS fibres embedded in a silicone matrix 10 made it possible to produce a composite membrane allowing baking temperatures reaching +300° C.

The thermal protection thus provided by the silicone matrix 10 to the PPS fibres at such temperatures higher than their limit temperature can advantageously be reinforced by adding supplementary metal fillers to the silicone matrix 10 of the composite membrane, in particular aluminium oxide and/or iron oxide, which make it possible to substantially homogenize the temperature in the composite membrane, thus avoiding hot spots which could be prejudicial to the resistance of the PPS fibres. Of course, this increased protection of the fibres, resulting from the particular effects obtained by adding supplementary metal fillers of the above-mentioned type, such as increased thermal stability and improved thermal conductivity, also benefits the combined inorganic and organic fibres other than the PPS fibres.

The inorganic fibres, in particular mineral or ceramic, and the organic fibres, in particular aramid or thermoplastic, chosen according to the envisaged applications, for the composite membranes are combined in inorganic and organic fibrils, themselves combined in filaments, in order to produce monofilament or multi-filament threads, constituting the textile-structure framework 11.

Thus, this framework 11 can be constituted by inorganic threads 12 combined with organic threads 13, the constitutions and relative numbers of the threads 12 and 13 being such that the inorganic fibres of the threads 12 always represent the majority by weight of the framework 11, and preferably, a proportion of approximately 60% to approximately 95% by weight of the framework 11.

Advantageously, however, the threads 12 and 13 are produced by mixing inorganic and organic fibrils, in proportions by weight which can be different for the threads and the threads 13. For example, the threads 12 can be constituted by mixing inorganic and organic fibrils so that the inorganic fibrils represent a proportion of approximately 60% to approximately 80% by weight of the threads 12, while the threads 13, also produced by mixing inorganic and organic fibrils, are such that the inorganic fibrils represent approximately 80% to approximately 95% by weight of the threads 13.

In order to facilitate the production of the framework 11 and make it more economical, it is also possible for the threads 12 and 13 to be produced by mixing inorganic and organic fibrils with substantially the same proportions of fibrils of the two types.

For example, each of the threads 12 and 13 can be composed of inorganic fibrils in a proportion by weight of the framework 11 which is comprised within a range of approximately 60% to approximately 95%, preferably approximately 70% to approximately 93%, and even more preferentially, approximately 80% to approximately 90%, the balance by weight being constituted by the organic fibrils.

The textile-structure framework 11 can also comprise continuous or discontinuous threads 12, 13, produced from said inorganic and organic fibres. Similarly, the textile-structure framework 11 can be constituted by threads 12, 13, certain of which at least can be parallel and/or by certain threads combined by twisting and/or textured, and/or mouliné, and/or also plated threads.

The combined inorganic and organic fibres, for example glass and polyester fibres, can undergo sizing, either at the level of the filaments constituting the threads 12 and 13 of the framework 11, and themselves resulting from the combination of inorganic and organic fibres by mixing of fibrils, or at the level of complete threads 12 or 13. In a known manner, this sizing consists of deposition of a bonding agent on the fibres of the filaments or threads, for example of the textiloplastic type, with an average wt % (weight percentage) varying from 0.05% to 10% by weight of the fibres, in order to ensure the cohesion of the fibrils and reduce the effects of abrasion during the operations of warping, weaving and knitting, in order to remedy the fragility of the filaments or threads to shearing and bending.

Private tests in continuous use since July 2006, on composite membranes the textile-structure framework of which combines glass and polyester fibres, mostly glass fibres in a proportion that can vary from approximately 60% to 95% by weight, have demonstrated a life time of the membranes increased by a factor of 3, i.e. a very significant increase in the longevity of the finished product, considerably delaying the phenomenon of breaking/shearing of the mesh of a knitted textile-structure framework 11.

In fact, the architecture of the textile-structure framework 11 can take different forms, in particular it can be woven, or non-woven, and optionally multilayer (by superimposition of woven and/or non-woven layers), or also be three-dimensional, and in particular in the form of a knitted fabric, preferably a double knitted fabric, i.e. a textile formed from two interlaced knitted fabrics made of mixed glass and polyester threads for example, previously impregnated with an anti-adhesive silicone rubber and hardened by vulcanization, according to the method described in FR 2 658 034.

In the case of a woven fabric architecture, the void fraction of the textile-structure framework 11 can be comprised between approximately 5% and approximately 60%, while in the preferred case of a knitted architecture, the void fraction of the textile-structure framework 11 is preferably comprised between approximately 5% and approximately 30%.

In order to produce such architectures, tests have been carried out combining glass fibre threads and polyester fibre threads corresponding to four different proportions by weight, with stoving of the produced architectures at 200° C.

The first example consisted of combining 44 tex glass fibre threads representing 75 wt % of the framework with 14 tex polyester fibre threads representing 25 wt % of the framework, and a deformation was observed after stoving at 200° C.

The second example consisted of combining 68 tex glass fibre threads representing 90 wt % of the framework with 7.5 tex polyester fibre threads representing 10 wt % of the framework, and no deformation was observed after stoving at 200° C.

The third example consisted of combining 68 tex glass fibre threads representing 82 wt % of the framework with 14 tex polyester fibre threads representing 18 wt % of the framework, and no deformation was observed after stoving at 200° C.

Finally, the fourth test consisted of combining the same 68 tex glass fibre threads in a proportion of 93 wt % with 5 tex polyester fibre threads representing 7 wt % of the framework, and no deformation was observed after stoving at 200° C.

With respect to the silicone matrix 10 used, the nature of the silicone elastomer is chosen according to its properties of keying to the textile-structure framework 11, as well as according to its anti-adhesion properties and its suitability for food use.

Taking account of the proportions by weight of the inorganic fibres used, and in particular the glass, it is practically guaranteed that more than half of the surface of contact and bonding between the fibres of the framework 11 and the silicone matrix 10 is provided by the inorganic fibres, essentially of glass, which guarantees an excellent bond between the matrix 10 and the framework 11. The silicone rubber of the matrix 10 can be at least one silicone elastomer belonging to the family of silicone elastomers that are polymerizable at a high temperature, the so-called HTV family, or on the other hand a silicone elastomer belonging to the so-called RTV family of silicone elastomers that are polymerizable at ambient temperature, or also a so-called addition-cure or bi-component silicone elastomer, one component of which is polymerizable at a high temperature, the other at ambient temperature.

Composite membranes are thus produced having the following benefits and advantages:

- an increased rigidity and resilience of the finished product (between +10% and +25%) facilitating handling for the user (industrial, semi-industrial, traditional or general public);
- an improved durability of the order of 40% of the above characteristics;
- a cost of materials of a framework 11 made of glass and polyester fibres which is less than the cost of a framework made solely of glass fibres;
- a very high degree of solidity, and, moreover, higher temperature resistance when, for example, aramid fibres are completely or partially substituted for the polyester fibres, combined with glass fibres;
- during the production of the composite membranes, defining a mould or cavity plate 1, the production scrappage rate is more than 20% lower than in the case of production of a composite membrane with a framework made solely of glass fibres, taking account of the absence of fibre breakage during the operation of shaping the textile-structure framework 11;
- a longevity of the finished product for the customer which is considerably increased, by a minimum of 30%.

The invention claimed is:

1. A flexible, self-supporting, anti-adhesive cellular membrane, comprising:
a mold or plate having cavities to prepare food products comprising a composite structure including a matrix of silicone rubber constituted by at least one elastomer or silicone resin, and reinforced by a textile-structure framework, constituted by a mixture of inorganic and organic threads and/or fibers, the inorganic threads and/or fibers representing a proportion comprised within a range of 60% to 95% by weight of the framework, and wherein the entire framework is constituted by one or more of glass and carbon fibers combined with one or more of polyester and Kevlar fibers, for constituting the molds or plates having the cavities that can be used within a temperature range of −60° C. to +220° C.

2. The membrane according to claim 1, wherein the silicone rubber of the matrix is at least one silicone elastomer chosen from the families of silicone elastomers that are polymerizable at a high temperature, at ambient temperature, or bi-component with one component being polymerizable at a high temperature and the other component at ambient temperature.

3. The membrane according to claim 2, wherein additional fillers are added to the matrix of the membrane.

4. The membrane according to claim 3, wherein the additional fillers comprise aluminum oxide or iron oxide.

5. The membrane according to claim 1, wherein the framework is constituted by the glass fibers and/or carbon fibers additionally combined with aramid and/or high-performance thermoplastic fibers, for constituting molds or plates having cavities that can be used up to a baking temperature of approximately +300° C.

6. The membrane according to claim 5, wherein the high-performance thermoplastic fibers comprise phenylene polysulphide (PPS) fibers.

7. The membrane according to claim 1, wherein the textile-structure framework comprises a non-woven, multilayer, three-dimensional structure.

8. The membrane according to claim 7, wherein the textile-structure framework comprises a woven structure with a void fraction comprised between 5% and 60%.

9. The membrane according to claim 7, wherein the textile-structure framework comprises a knitted structure with a void fraction comprised between 5% and 30%.

10. The membrane according to claim 1, wherein the inorganic threads and/or fibers additionally comprise ceramic fibers and/or mineral fibers.

11. The membrane according to claim 1, wherein the organic threads and/or fibers additionally comprise aramid fibers, and/or fibers of thermoplastic polymers.

12. The membrane according to claim 1, wherein the textile structure of the framework comprises at least one type of threads selected in the group comprising continuous threads, discontinuous threads, mono-filaments and multi-filaments produced from said organic and inorganic fibers.

13. The membrane according to claim 1, wherein a combination of organic and inorganic fibers for producing said textile-structure framework is constituted by at least one type of threads selected in the group comprising parallel threads, plated threads, textured threads, threads combined by twisting, mouliné threads, and threads obtained by mixing inorganic and organic fibers.

14. The membrane according to claim 1, wherein said inorganic and organic fibers constituting said textile-structure framework are fibers that are sized by a deposition of a bonding agent representing an average proportion by weight of the fibers which varies from approximately 0.05% to approximately 10%, the sizing of said fibers being carried out at the level of filaments or at the level of complete threads produced from the fibers.

15. The membrane according to claim 1, wherein the inorganic threads and/or fibers represent a proportion within a range of 70% to 93% by weight of the framework.

16. The membrane according to claim 1, wherein the inorganic threads and/or fibers represent a proportion within a range of 80% to 90% by weight of the framework.

* * * * *